United States Patent
Zhu

(10) Patent No.: US 7,532,255 B2
(45) Date of Patent: *May 12, 2009

(54) COLOR TRANSIENT IMPROVEMENT UNIT AND METHOD TO REDUCE BLURRING AT COLOR TRANSIENTS IN VIDEO IMAGES

(75) Inventor: Ge Zhu, Shanghai (CN)

(73) Assignee: Huaya Microelectronics, Ltd., San Jose, CA (US)

( * ) Notice: Subject to any disclaimer, the term of this patent is extended or adjusted under 35 U.S.C. 154(b) by 823 days.

This patent is subject to a terminal disclaimer.

(21) Appl. No.: 10/839,740

(22) Filed: May 4, 2004

(65) Prior Publication Data

US 2005/0099536 A1 May 12, 2005

(30) Foreign Application Priority Data

Nov. 10, 2003 (CN) ............ 2003 1 0108511

(51) Int. Cl.
*H04N 5/21* (2006.01)
(52) U.S. Cl. .............. 348/631; 348/630; 348/625
(58) Field of Classification Search ........ 348/630–631, 348/625, 606–607, 624, 627, 628–639; 382/266–267, 382/263, 268–269, 262; *H04N 5/21*
See application file for complete search history.

(56) References Cited

U.S. PATENT DOCUMENTS

| 5,920,357 | A * | 7/1999 | Ohara | 348/625 |
|---|---|---|---|---|
| 6,181,385 | B1 * | 1/2001 | Correa | 348/625 |
| 6,421,462 | B1 * | 7/2002 | Christian et al. | 382/219 |
| 6,795,083 | B2 * | 9/2004 | Bao et al. | 345/589 |
| 7,289,163 | B2 * | 10/2007 | Lin et al. | 348/631 |

* cited by examiner

*Primary Examiner*—Trang U Tran
(74) *Attorney, Agent, or Firm*—Silicon Valley Patent Group, LLP; Edward S. Mao

(57) ABSTRACT

A color transient improvement unit and method for improving color transients to remove blurring along the edges of color transitions is presented. A transient characterization unit calculates various transient characterization values for a color transient detection window surrounding a current pixel. A transient threshold unit analyzes the transient characterization values to determine whether the color transient detection window contains a color transition. If a color transition exists, a transient correction unit generates an improved U chrominance value and an improved V chrominance value for the current pixel.

24 Claims, 10 Drawing Sheets

COLOR TRANSIENT IMPROVEMENT UNIT AND METHOD TO REDUCE BLURRING AT COLOR TRANSIENTS IN VIDEO IMAGES

BACKGROUND OF THE INVENTION

1. Field of the Invention

The present invention relates to digital image and video processing. More specifically, the present invention relates to methods of enhancing picture quality of video streams.

2. Discussion of Related Art

Due to advancing semiconductor processing technology, integrated circuits (ICs) have greatly increased in functionality and complexity. With increasing processing and memory capabilities, many formerly analog tasks are being performed digitally. For example, images, audio and even full motion video can now be produced, distributed, and used in digital formats.

FIG. 1 is an illustrative diagram of a portion of interlaced digital video stream 100 most often used in television systems. Interlaced digital video stream 100 comprises a series of individual fields 100_1 to 100_N, of which the first ten fields are shown. Even fields contain even numbered rows while odd fields contain odd numbered rows. For example if a frame has 400 rows of 640 pixels, the even field would contains rows 2, 4, . . . 400 and the odd field would contains rows 1, 3, 5, . . . 399 of the frame. In general for an interlaced video stream each field is formed at a different time. For example, an interlaced video capture device (e.g. a video camera) captures and stores the odd scan lines of a scene at time T as field 100_1, then the video capture device stores the even scan lines of a scene at time T+1 as field 100_2. The process continues for each field.

Interlaced video systems were designed when bandwidth limitations precluded progressive (i.e., non-interlaced) video systems with adequate frame rates. Specifically, interlacing two 30 fps fields achieved an effective 60 frame per second frame rate because the phosphors used in television sets would remain "lit" while the second field is drawn. Progressive video streams use complete frames, including both the even and odd scan lines instead of fields. Because progressive scan provides better display quality, computer systems, which were developed much later than the original television systems, use progressive scan display systems. Furthermore, many modern televisions and television equipment are being developed to use progressive video streams. To maintain compatibility with existing interlaced video systems, modern progressive systems use deinterlacing techniques to convert interlaced video streams into progressive video streams.

FIGS. 2(a) and 2(b) illustrate a typical method of generating a progressive video stream 200 from an interlaced video stream 100. Specifically each field 100_X of interlaced video stream 100 is converted to a frame 200_X of progressive video stream 200. The conversion of a field to a frame is accomplished by generating the missing scan lines in each frame by copying or interpolating from the scan lines in the field. For example, as illustrated in FIG. 2(b) field 100_1 having odd scan lines 100_1_1, 100_1_3, 100_1_5, . . . 100_1_N, is converted into a frame 200_1 by copying scan lines 100_1_X as odd scan lines 200_1_X, where X is an odd number and creating even scan lines 200_1_Y, where Y is an even number. Even scan lines 200_1_Y can be created by copying the preceding odd scan line 200_1_Y−1. This technique is commonly known as line repeat. Better results can be obtained using various interpolation schemes to generate the missing scan lines. For example, one interpolation scheme simply averages odd scan line 200_1_Y−1 with odd scan line 200_1_Y+1 to generate even scan line 200_1_Y. Other interpolation schemes may use weighted averages or other more complicated ways to combine data from the existing scan lines to generate the missing scan lines. Another normal mode deinterlacing technique known as 3D deinterlacing involves generating the missing scan lines by interpolating the missing pixels using data from adjacent fields. Conversion of fields into frames is not an integral part of the present invention. The principles of the present invention can easily be adapted for use with any form of field to frame conversion.

While de-interlacing techniques allow interlaced video streams to be displayed on progressive scan devices, the image quality of the de-interlaced video stream is typically of much lower image quality than true progressive scan video streams (i.e. video streams that were generated using progressive scan equipment). Hence, there is a need for a method or system that can enhance the image quality of the frames in a de-interlaced video stream.

SUMMARY

Accordingly, the present invention provides methods and systems for enhancing the image quality of a video stream. While the methods and systems of the present invention are especially well-suited for de-interlaced video streams, the methods and systems of the present invention also provide enhancement to the image quality of true progressive video streams as well. Specifically, the present invention enhances the chrominance and luminance of a de-interlaced video frame independently. Thus, in most embodiments of the present invention the luminance enhancement and chrominance enhancements are performed in parallel to reduce processing time.

In some embodiment of the present invention, an image enhancement unit combines a contour enhancement unit and a luminance contrast stretching unit to enhance the luminance values of the input video stream. The image enhancement unit also includes a color transient improvement unit and a color saturation control unit to enhance the chrominance values of the input video stream. Specifically, the contour enhancement unit enhances the contours of the images in the input video stream to improve the depth-of-field of the images around lines and edges. The luminance contrast stretching unit stretches the luminance values to enhance contrast of the images. The color transient improvement unit improves color transients to remove blurring along the edges of color transitions. The color saturation control unit adjusts the color saturation to compensate for washed out colors that may result from analog to digital conversions.

In one embodiment of the contour enhancement unit, a contour detection unit is configured to determine a dominant contour direction for a current pixel. A contour enhanced luminance calculation unit enhances the contour by a contour enhancement factor along the dominant contour direction. The contour direction is approximated using slopes. Specifically, the slopes in a variety of slope directions are calculated and the slope direction with the greatest absolute slope value is selected as the direction of the contour. A contour threshold comparison unit compares the difference between the greatest absolute slope value and the second greatest absolute slope value with a contour enhancement threshold. When the difference is greater than the contour enhancement threshold, contour enhancement is performed.

In an embodiment of the color transient improvement unit, a transient characterization unit is configured to calculate transient characterization values for a color transient detection window that contains a current pixel. A transient threshold unit determines whether a color transient exists in the color transient detection window by comparing the transient characterization values to a chrominance color improvement threshold. When a color transient is detected, a transient correction unit generates an improved U chrominance value and an improved V chrominance value for the current pixel.

In an embodiment of the color saturation control unit, a scaled saturation enhancement factor calculation unit is configured to generate a scaled saturation enhancement factor using a base saturation enhancement factor. A multiplier is coupled to receive the scaled saturation enhancement factor and configured to generate a saturation enhanced U chrominance value and a saturation enhanced V chrominance for the current pixel. Specifically, the saturation enhanced U chrominance value is equal to the scaled saturation enhancement factor multiplied by the current U chrominance value of the current pixel. Similarly, the saturation enhanced V chrominance value is equal to the scaled saturation enhancement factor multiplied by the current V chrominance value of the current pixel. To maintain the proper color the ratio of the saturation enhanced U chrominance value to the saturation enhanced V chrominance value should be equal to the ratio of the current U chrominance value to the current V chrominance value. An index calculation and control circuit receives the base saturation enhancement factor, the current U chrominance value, and the current V chrominance value and generates an index to a lookup table. The lookup table contains tabled saturation enhancement factors that can be used as the scaled saturation enhancement factor when the base saturation enhancement factor would cause the saturation enhanced U chrominance value or the saturation enhanced V chrominance value to exceed a valid range of chrominance values.

The present invention will be more fully understood in view of the following description and drawings.

DETAILED DESCRIPTION

As explained above, interlaced video streams that are de-interlaced into progressive video streams are typically of lower image quality than true progressive video streams. The present invention presents four novel image enhancement techniques that can be used singly or in combination to enhance the image quality of a frame of a video stream.

Figure 1:
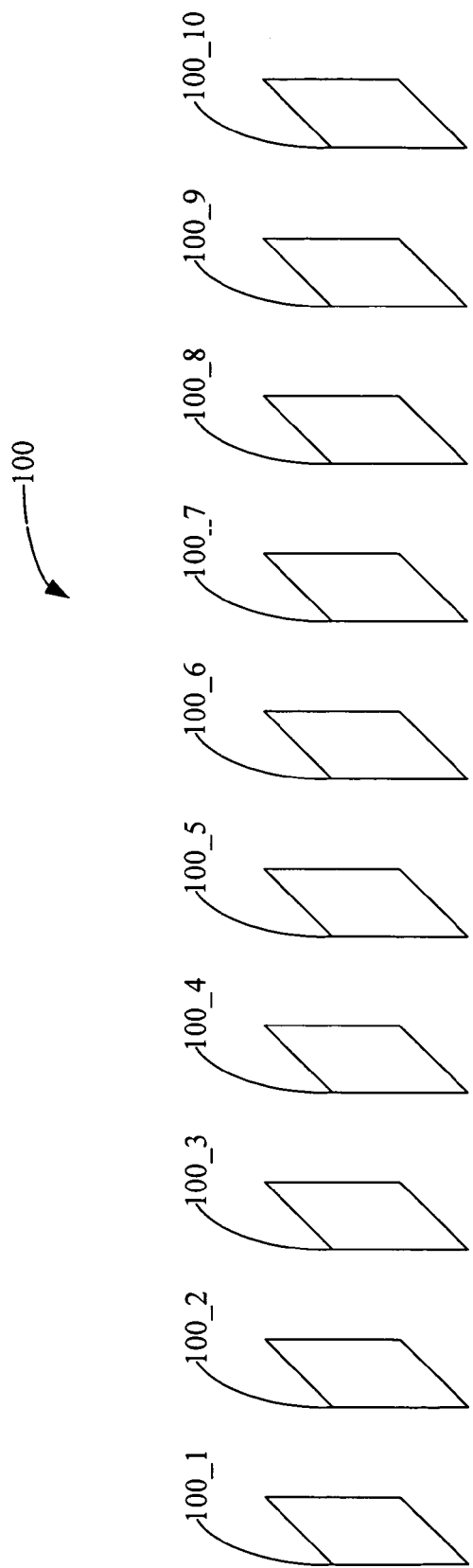
FIG. 1 is an illustration of an interlaced video stream.
Figure 2A:
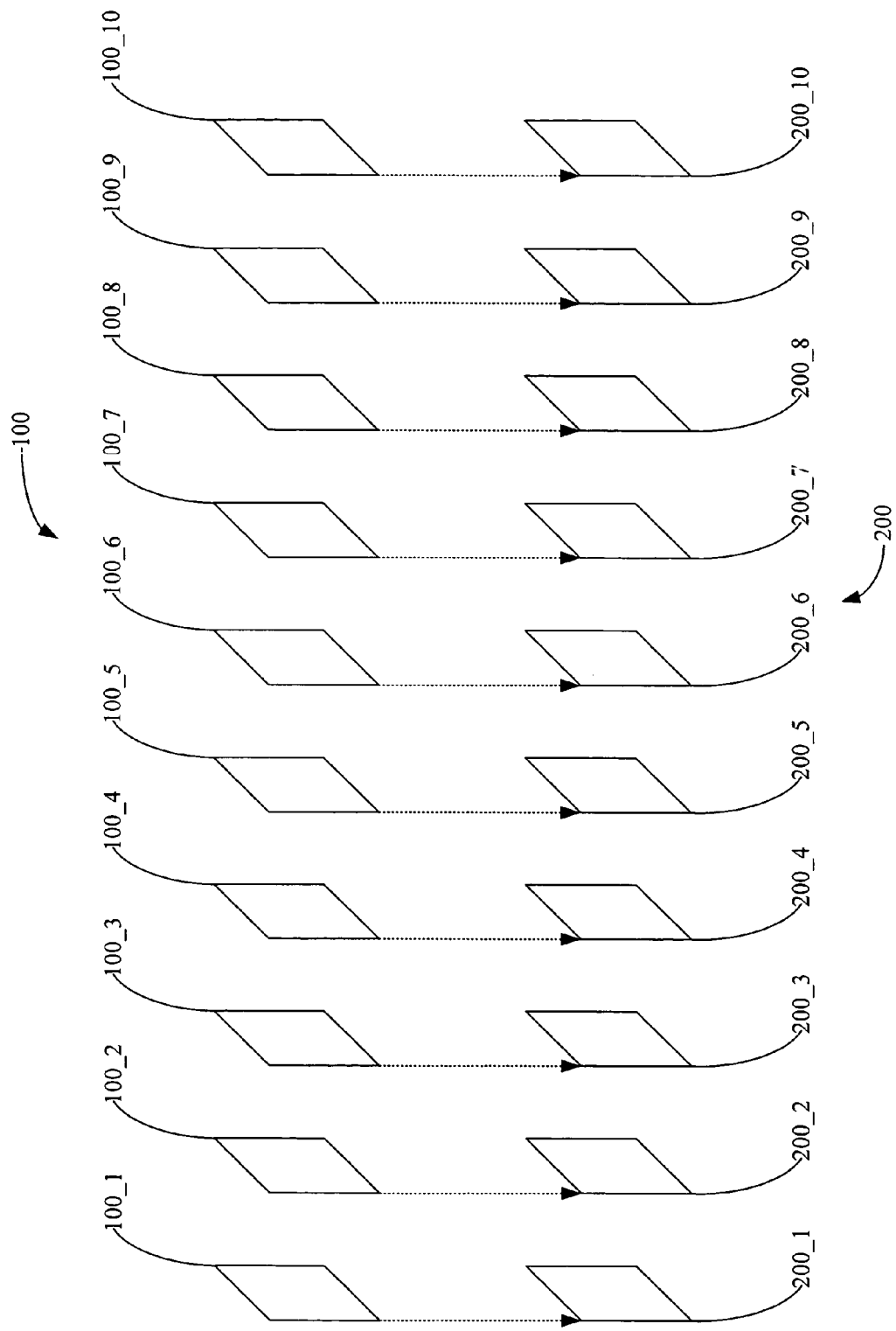
FIGS. 2(a) and 2(b) illustrate a deinterlacing process to form a de-interlaced video stream.
Figure 2B:
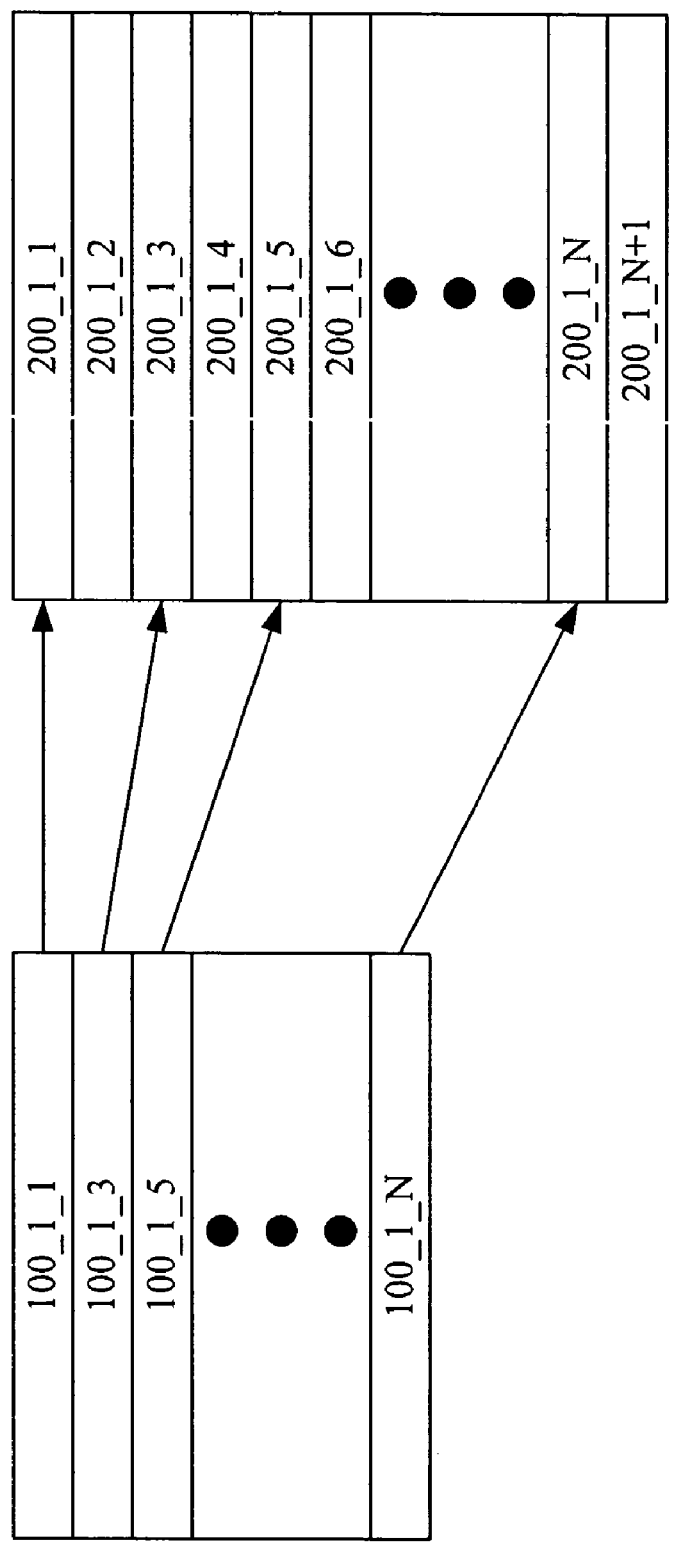
Figure 3:
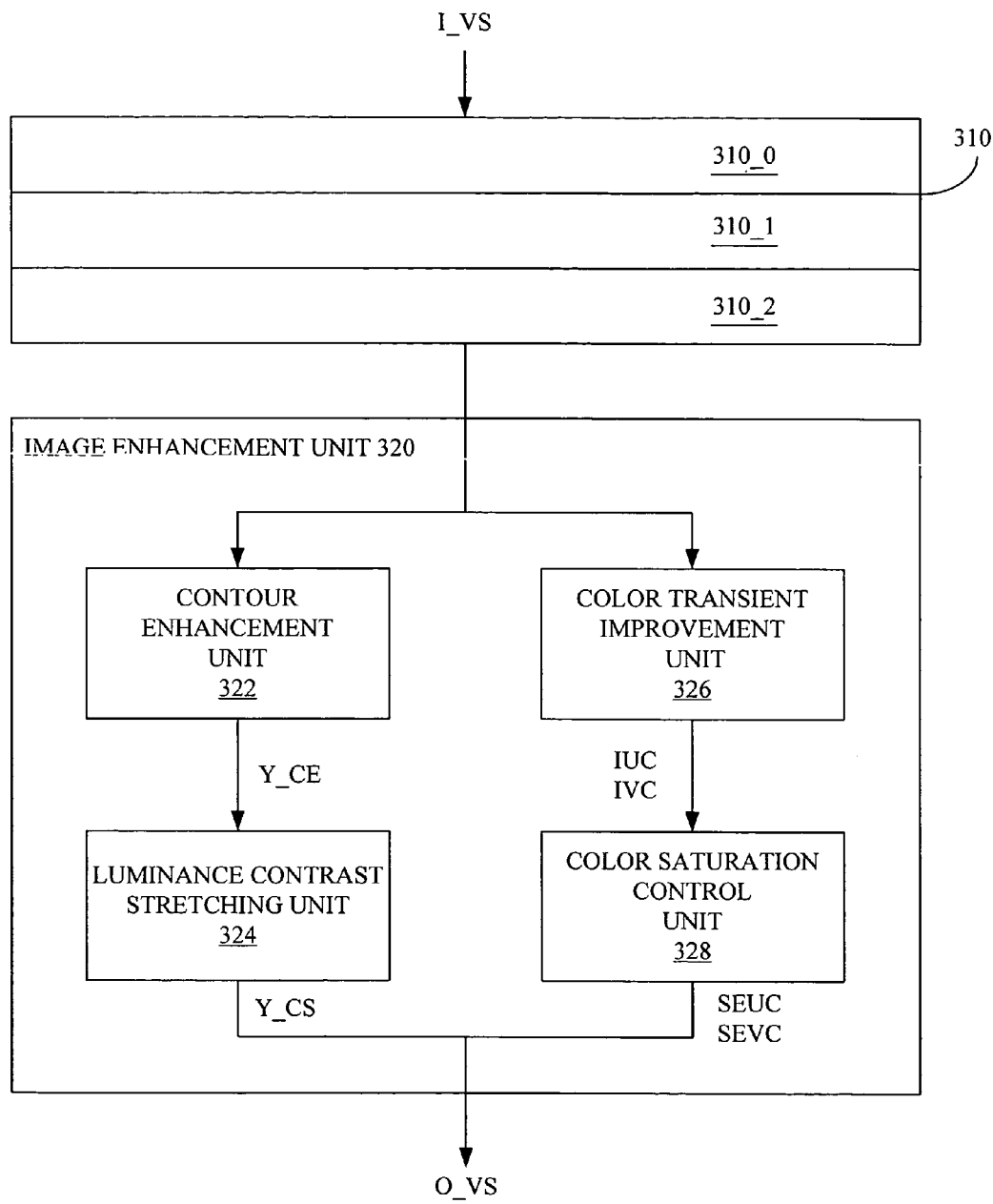
FIG. 3 is a simplified block diagram of an image enhancement unit in accordance with one embodiment of the present invention.

FIG. 3 is a simplified block diagram of an image enhancement unit 320 coupled to a buffer 310. Buffer 310 includes a first line buffer 310_0, a second line buffer 310_1, and a third line buffer 310_2. The size of the line buffers is typically equal to the line size of a frame in an input video stream I_VS. Buffer 310 is used as a circular buffer so that the first line of a frame of input video stream I_VS is written into line buffer 310_0, the second line of the frame is written into line buffer 310_1, the third line of frame is written into line buffer 310_2. Then the fourth line of the frame is written into line buffer 310_0, the fifth line of frame is written into line buffer 310_1, and the sixth line of the frame is written into line buffer 310_2. This process continues for all the lines of each frame of input video stream I_VS.

Thus, in general buffer 310 contains three lines of a frame from input video stream I_VS. In one embodiment of the present invention, image enhancement unit 320 uses a current line pointer CLP to track which line buffer contains the current line that is being processed, a previous line pointer PLP to track which line buffer contains the line before the current line, and a next line pointer NLP to track which line buffer contains the line following the current line. Thus, initially, previous line pointer PLP would point to line buffer 310_0, current line pointer CLP would point to line buffer 310_1, and next line pointer NLP would point to line buffer 310_2. However, as new lines are written into buffer 310 from a frame of input video stream I_VS, previous line pointer PLP, current line pointer CLP, and next line pointer NLP would be incremented by 1 using modulo 3 addition (i.e. incremented by 1 but also reset to 0 if the pointer is equal to 3 after being incremented). Specifically, if previous line pointer PLP is pointing to line buffer 310_X, after a new line is read into buffer 310, previous line pointer PLP would point to line buffer 310_((X+1) MOD 3). For convenience, the line in the buffer pointed to by previous line pointer PLP is called the "previous line." Similarly, the line in the buffer pointed to by current line pointer CLP is called the "current line" and the line in the buffer pointed to by next line pointer NLP is called the "next line." Other embodiments of the present invention may include a larger buffer to store more lines simultaneously.

Image enhancement unit 320 includes a contour enhancement unit 322, a luminance contrast stretching unit 324, a color transient improvement unit 326, and a color saturation control unit 328. Contour enhancement unit 322 and luminance contrast stretching unit 324, which process the luminance values of a frame, can function in parallel with color transient improvement unit 326 and color saturation control unit 328, which process the chrominance value of the frames.

Contour enhancement unit 322 performs contour enhancement to improve the depth-of-field of an image around lines and edges. Specifically, contour enhancement unit 322 enhances local contour based on a user programmable contour enhancement factor CEF. A novel contour enhancement unit is described below. Luminance contrast stretching unit 324 stretches the luminance values to enhance contrast. A novel luminance contrast stretching unit is described below.

Color transient improvement unit 326 improves color transients to remove blurring along the edge between two color areas. A novel digital color transient improvement unit is described below. Color saturation control unit 328 increases the color saturation to compensate for washed out colors caused by analog to digital conversion. A novel color saturation control unit is described below.

Generally, image enhancement unit 320 processes one pixel at a time from buffer 310. For convenience and clarity, the pixel currently being processed is referred to herein as the current pixel. As explained above, contour enhancement unit 322 and luminance contrast stretching unit 324 would process the luminance value Y of the current pixel. Specifically, contour enhancement unit 322 generates a contour enhanced luminance value Y_CE and luminance contrast stretching unit 324 generates a contrast stretched luminance value Y_CS from contour enhanced luminance value Y_CE. Color transient improvement unit 326 and color saturation control unit 328 would process the chrominance values U and V of the current pixel. Specifically, color transient improvement unit 326 generates improved U chrominance value IUC and improved chrominance value IVC and color saturation control unit 328 generates saturation enhanced U chrominance value SEUC and saturation enhanced V chrominance value SEVC from improved U chrominance value IUC and improved V chrominance value IVC.

Figure 4:
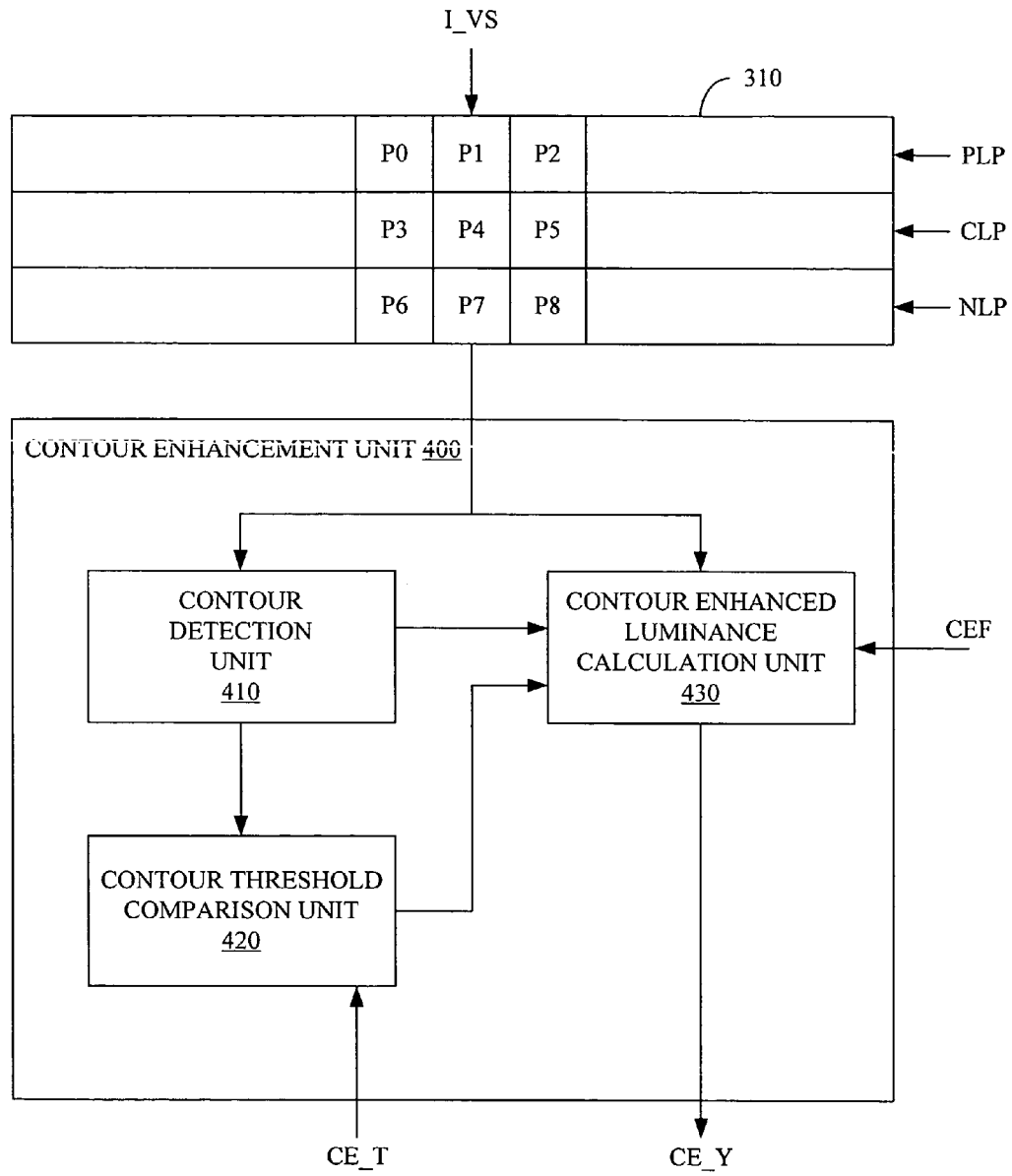
FIG. 4 is a simplified block diagram of contour enhancement unit in accordance with one embodiment of the present invention.

FIG. 4 is a simplified block diagram of a contour enhancement unit 400 in accordance with one embodiment of the present invention. Contour enhancement unit 400 includes a contour detection unit 410, a contour threshold comparison unit 420, and a contour-enhanced luminance calculation unit 430. In FIG. 4, contour enhancement unit 400 is coupled to buffer 310, which is illustrated using previous line pointer PLP, current line pointer CLP and next line pointer NLP. Contour enhancement unit 400 is configured to generate contour enhanced luminance value Y_CE for current pixel P4 using the luminance value of current pixel P4 and the luminance values of pixels P0, P1, P2, P3, P5, P6, P7, and P8, which surround current pixel P4. Specifically, current pixel P4, pixel P3 and pixel P5 are in the current line (i.e. in the line buffer pointed to by current line buffer CLP), with pixel P3 to the left of current pixel P4 and pixel P5 to the right of current pixel P4. Pixels P0, P1, and P2 are in the previous line (i.e. in the line buffer pointed to by previous line buffer PLP) directly above pixels P3, P4, and P5, respectively. Conversely, pixels P6, P7, and P8 are in the next line (i.e. in the line buffer pointed to by the next line buffer NLP), directly below pixels P3, P4, and P5, respectively. For clarity the luminance value of a pixel PX is referenced as luminance value YX. Thus, the luminance value of pixel P5 is luminance value Y5.

Contour detection unit 410 detects the contour around current pixel P4. In the embodiment of FIG. 4, slope around current pixel P4 is used as a proxy for the magnitude of the contour directions around current pixel P4. Specifically in the embodiment of FIG. 4, contour detection unit 410 calculates the slopes around current pixel P4 and selects the direction with the largest absolute slope value as the dominant contour direction of the contour around pixel P4. The largest absolute slope value is also used to represent the magnitude of the dominant contour direction. In one embodiment of contour detection unit 410, three slopes for three directions are calculated: horizontal slope S_H, vertical slope S_V, and diagonal slope S_D.

Horizontal slope S_H represents the amount of luminance change due to horizontal contour passing through current pixel P4. Equation EQ(1) gives the formula used by one embodiment of the present invention to calculate horizontal slope S_H. In equation EQ(1), horizontal slope S_H is equal to the average of the luminance values of pixels P3, P4, and P5 minus the average of the luminance values of pixels P0, P1, P2, P6, P7 and P8.

$$S\_H=(Y3+Y4+Y5)/3-(Y0+Y1+Y2+Y6+Y7+Y8)/6 \qquad EQ(1)$$

Conversely, vertical slope S_V represents the amount of luminance change due to the vertical contour passing through current pixel P4. Equation EQ(2) gives the formula used by one embodiment of the present invention to calculate vertical slope S_V. In equation EQ(2), vertical slope S_V is equal to the average of the luminance values of pixels P1, P4 and P7 minus the average of the luminance values of pixels P0, P3, P6, P2, P5 and P8.

$$S\_V=(Y1+Y4+Y7)/3-(Y0+Y3+Y6+Y2+Y5+Y8)/6 \qquad EQ(2)$$

Diagonal slope S_D represents the amount of luminance change around current pixel P4 in a diagonal direction (both 45 degrees and 135 degrees). Equation EQ(3) gives the formula used by one embodiment of the present invention to calculate diagonal slope S_D. In equation EQ(3), diagonal slope S_D is equal to the luminance value of pixel P4 minus the average of the luminance values of pixels P1, P3, P5 and P7.

$$S\_D=Y4-(Y1+Y3+Y5+Y7)/4 \qquad EQ(3)$$

A positive value for horizontal slope S_H, vertical S_V, or diagonal slope S_D indicates that current pixel P4 is on the brighter side of an edge (assuming higher luminance value represents brighter pixels). Conversely, a negative value for horizontal slope S_H, vertical S_V, or diagonal slope S_D indicates that current pixel P4 is on the darker side of an edge.

Other embodiments of the present invention can calculate slopes differently. For example in a specific embodiment of the present invention, rather than a single diagonal slope S_D, a 45 degree slope S__45 and a 135 degree slope S__135 are used. Furthermore, some embodiments of the present invention may use additional slope directions. For example, the slope value of a slope direction between 45 degree and 90 degree can be calculated as the average of the luminance values of pixels P2, P4 and P7 minus the average of the luminance values of pixels P1, P3, P6, P5 and P8.

In general contour enhancement should be performed in the dominant contour direction. However if the magnitude of the dominant contour direction is not significantly greater than the magnitude of the secondary contour direction contour enhancement should not be performed. Specifically, when the magnitude of the dominant contour direction minus the magnitude of the secondary contour direction is greater than a contour enhancement threshold then contour enhancement should be performed. However, when the magnitude of the dominant contour direction minus the magnitude of the secondary contour direction is less than or equal to the contour enhancement threshold then contour enhancement should not be performed.

When slope direction as a proxy for contour direction, contour enhancement should be performed in the dominant slope direction. The dominant slope direction has the largest absolute slope value. For clarity the slope value in the dominant slope direction is referred to as the dominant slope value. For clarity, a maximum slope S_MAX is defined to be equal to the largest absolute value of the directional slopes (e.g. horizontal slope S_H, vertical slope S_V, and diagonal slope S_D). Thus, the absolute value of the dominant slope value would be equal to maximum slope S_MAX. However if maximum slope S_MAX, which is a proxy for the magnitude of the dominant contour direction is not significantly greater than the next largest absolute slope value, which is a proxy for the magnitude of the secondary contour direction, contour enhancement should not be performed. Thus, contour threshold comparison unit 420 calculates both maximum slope S_MAX and a next maximum slope S_NEXT, where next maximum slope S_NEXT is equal to the second largest absolute value among the directional slopes. If maximum slope S_MAX minus next maximum slope S_NEXT is less than or equal to a contour enhancement threshold CE_T then contour enhancement is not performed and contour-enhanced luminance calculation unit 430 is configured to set contour enhanced luminance value Y_CE to be equal to luminance value Y4 (i.e., the original luminance value of current pixel P4). However, if maximum slope S_MAX minus next maximum slope S_NEXT is greater than contour enhancement threshold CE_T then contour enhancement contour enhanced luminance calculation unit 430 is configured to generate a contour enhanced luminance value Y_CE using contour enhancement factor CEF. In theory contour enhancement threshold CE_T can be any value within the range of luminance values. However, setting contour enhancement threshold CE_T to a large value would only enhance edges that are already "stand out" in the frame. Thus, contour enhancement threshold should be small in comparison to the maximum luminance value so that blurry edges will be enhanced. For example in one embodiment of the present invention the luminance range is 0 to 255 (i.e. 8-bit pixels) and the contour enhancement threshold has a default value of 5 with a recommended range of 0 to 10.

If contour enhancement should occur, contour-enhanced luminance calculation unit generates contour enhanced luminance value Y_CE so that a contour enhanced slope S_CE calculated with contour enhanced luminance value Y_CE in place of luminance value Y4 would equal the contour enhanced factor CEF multiplied by the dominant slope value calculated using luminance value Y4. Thus for example if horizontal slope S_H were the dominant slope value (i.e., maximum slope S_MAX is equal to the absolute value of horizontal slope S_H), then contour enhanced slope S_CE should be equal to contour enhanced factor CEF multiplied by horizontal slope S_H. Equation EQ(4) illustrates the calculation of contour enhanced slope S_CE if horizontal slope S_H is the dominant slope value. Specifically, Equation EQ(4) is the same as Equation EQ(1) except that luminance value Y4 is replaced with contour enhanced luminance value Y_CE.

$$S\_CE=(Y3+Y\_CE+Y5)/3-(Y0+Y1+Y2+Y6+Y7+Y8)/6 \quad \text{EQ(4)}$$

Replacing contour enhanced slope S_CE with contour enhanced factor CEF multiplied by horizontal slope S_H yields Equation EQ(5).

$$CEF*S\_H=(Y3+Y\_CE+Y5)/3-(Y0+Y1+Y2+Y6+Y7+Y8)/6 \quad \text{EQ(5)}$$

Equation EQ(5) can be rearranged to generate equation EQ(6), which provides a formula for contrast enhanced luminance value Y_CE when horizontal slope S_H is the dominant slope value.

$$Y\_CE=3*S\_H*CEF+(Y0+Y1+Y2+Y6+Y7+Y8)/2-Y3-Y5 \quad \text{EQ(6)}$$

Similarly, equations EQ(7) and EQ(8) can be generated for calculating contour enhanced value Y_CE when the dominant slope value is vertical slope S_V and diagonal slope S_D, respectively.

$$Y\_CE=3*S\_V*CEF+(Y0+Y3+Y6+Y2+Y5+Y8)/2-Y1-Y7 \quad \text{EQ(7)}$$

$$Y\_CE=S\_D*CEF+(Y1+Y3+Y5+Y7)/4 \quad \text{EQ(8)}$$

However, as explained above if maximum slope S_MAX minus next maximum slope S_NEXT is less than or equal to contour enhancement threshold CE_T, contour enhanced luminance calculation unit 430 is configured to set contour enhanced luminance value Y_CE to be equal to luminance value Y4 regardless of which slope is the dominant slope direction. Contour enhancement factor CEF should be a positive real number greater than or equal to 1 (a contour enhancement factor equal to 1 would provide no enhancement and would effectively deactivate contour enhancement). If contour enhancement factor CEF is less than 1 then contours are actually blurred rather than enhanced. In general larger values for contour enhancement factor CEF produces sharper edges. In one embodiment of the present invention, contour enhancement factor CEF is stored in a programmable register and has a default value of 1.5 with a suggested range of 1.0 to 3.0.

Figure 5:
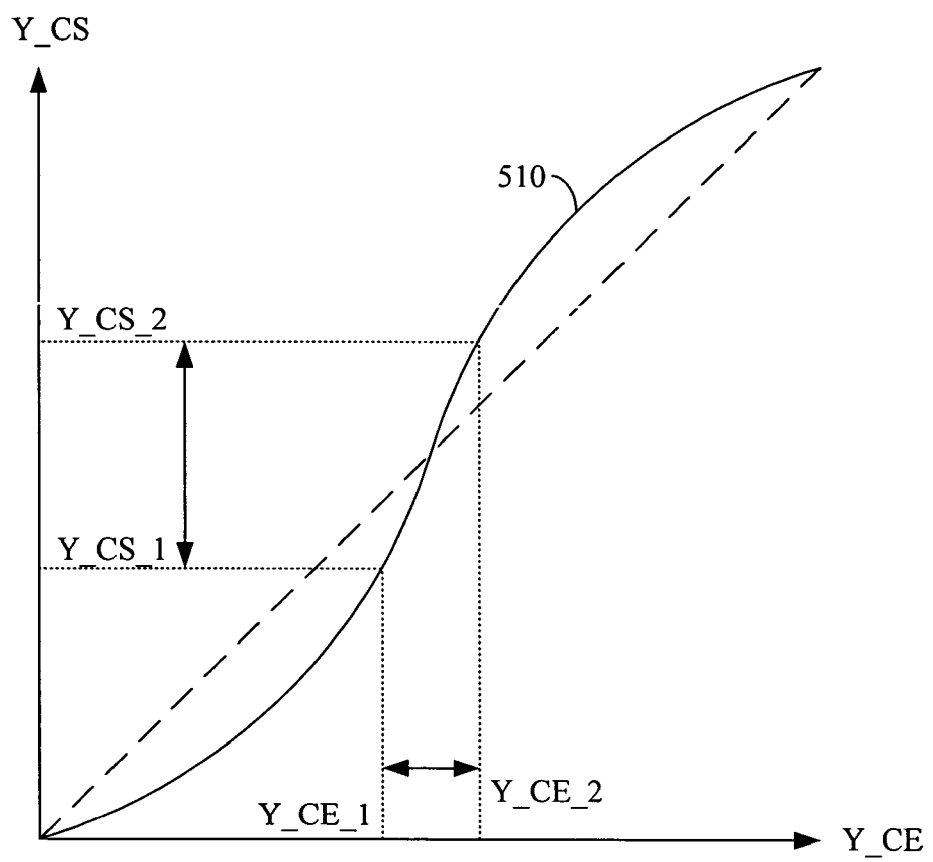
FIG. 5 illustrates the function of a luminance contrast stretching unit in accordance with one embodiment of the present invention.

As illustrated in FIG. 3, contour enhancement unit 322 provides contour enhanced luminance value Y_CE to luminance contrast stretching unit 324, which generates contrast stretched luminance value Y_CS. Luminance contrast stretching unit 324 increases the contrast between pixels except in very dark or very bright areas of the frame. In one embodiment of the present invention, luminance contrast stretching unit 324 maps each contour enhance luminance value Y_CE to a contrast stretched luminance value Y_CS using sigmoid-like function. FIG. 5 illustrates a sigmoid function 510 with the contour enhanced luminance values on the horizontal axis and the contrast stretched luminance values on the vertical axis. Specifically, FIG. 5 shows that a first contour enhanced luminance value Y_CE_1 and a second contour enhanced luminance value Y_CE_2 are mapped through sigmoid function 510 into a first contrast stretched luminance value Y_CS_1 and a second contrast stretched luminance value Y_CS_2, respectively. For most values of the contour enhanced luminance, the contrast between the first contrast stretched luminance value Y_CS_1 and the second contrast stretched luminance value Y_CS_2 is greater than the contrast between the first contour enhanced luminance value Y_CE_1 and the second contour enhanced luminance value Y_CE_2. However, in very bright or very dark regions (i.e., for large or small values of contour enhanced luminance values), the contrast between the contrast stretched luminance values is less than the contrast between the contour enhanced luminance values. Thus, luminance contrast stretching unit 324 enhances contrast only in regions that are not very bright or not very dark. For example, where luminance ranges between 0 and 255, very bright typically means luminance values greater than 240 and very dark typically means luminance values less than 15. For a video system with relatively small luminance values range (e.g. 0 to 255), many embodiments of the present invention implements luminance contrast stretching unit 324 as a predefined lookup table (LUT). The characteristics of the sigmoid function can be changed by changing the values in the lookup table. For larger ranges of luminance values (e.g. 0 to 1023 for 10-bit systems) various fitting formulas can be used to piece-wisely represent the sigmoid function without requiring a look up table encompassing the whole range of luminance values. Contrast stretched luminance value Y_CS is combined with saturation enhanced U chrominance value SEUC and saturation enhanced V chrominance value SEVC to form a pixel in output video stream O_VS.

Figure 6A:
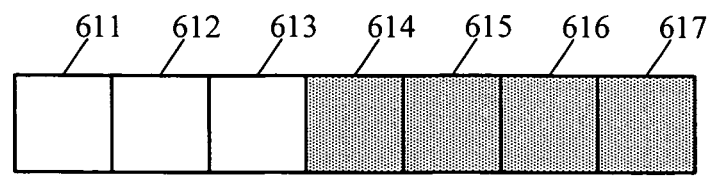
Figs. 6(a) through 6(e) illustrates the color transient problem.
Figure 6B:
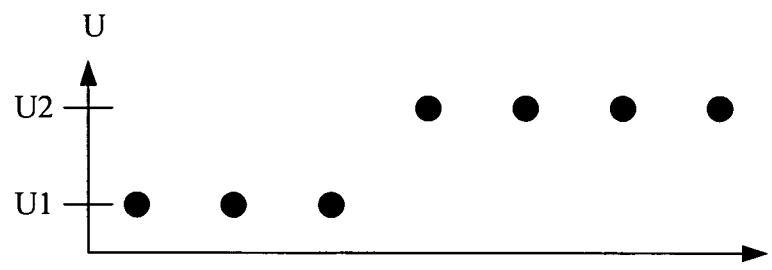
Figure 6C:
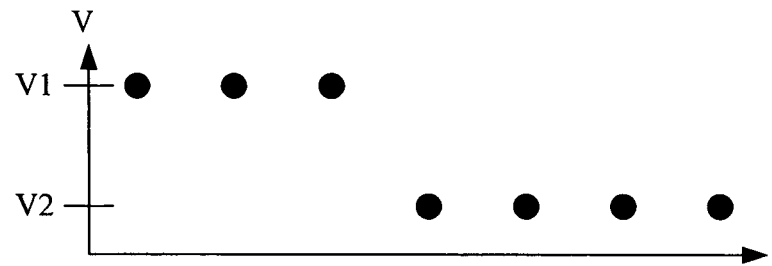
Figure 6D:
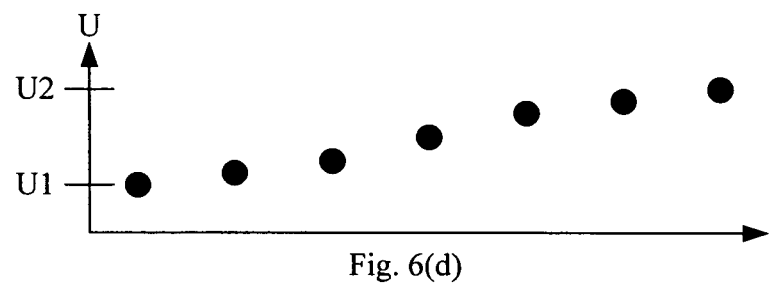

While contour enhancement unit 322 and luminance contrast stretching unit 324 processes the luminance of a current pixel, color transient improvement unit 326 and color saturation control unit 328 can process the chrominance values of the current pixel. FIGS. 6(*a*)-6(*e*) illustrate a color transient issue, which occurs frequently due to imperfect decoding of video streams. FIG. 6(*a*) shows seven pixels 611-617. Pixels 611-613 are part of a first color region and pixels 614-617 are part of a second color region. Ideally the transition between the first color region and the second color region would be very distinct. For example, FIG. 6(b) illustrates the U chrominance value of 611, 612, and 613 are equal to a first U chrominance value U1 and the U chrominance value of pixels 614, 615, 616, and 617 are equal to a second U chrominance value U2. Similarly, FIG. 6(c) illustrates the V chrominance value of 611, 612, and 613 are equal to a first V chrominance value V1 and the V chrominance value pixels 614, 615, 616, and 617 are equal to a second V chrominance value V2. However, the actual chrominance values between two color regions generally exhibit a gradual change rather than a sharp change. For example, as illustrated in FIG. 6(d), the U chrominance value of pixels 611-617 gradually increases from U chrominance value U1 to U chrominance value U2. Similarly, as illustrated in FIG. 6(e) the V chrominance value of pixels 611-617 gradually decreases from V chrominance value V1 to V chrominance value V2.

Figure 6E:
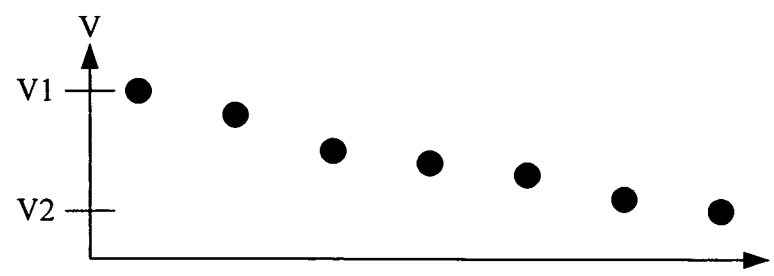
Figure 7:
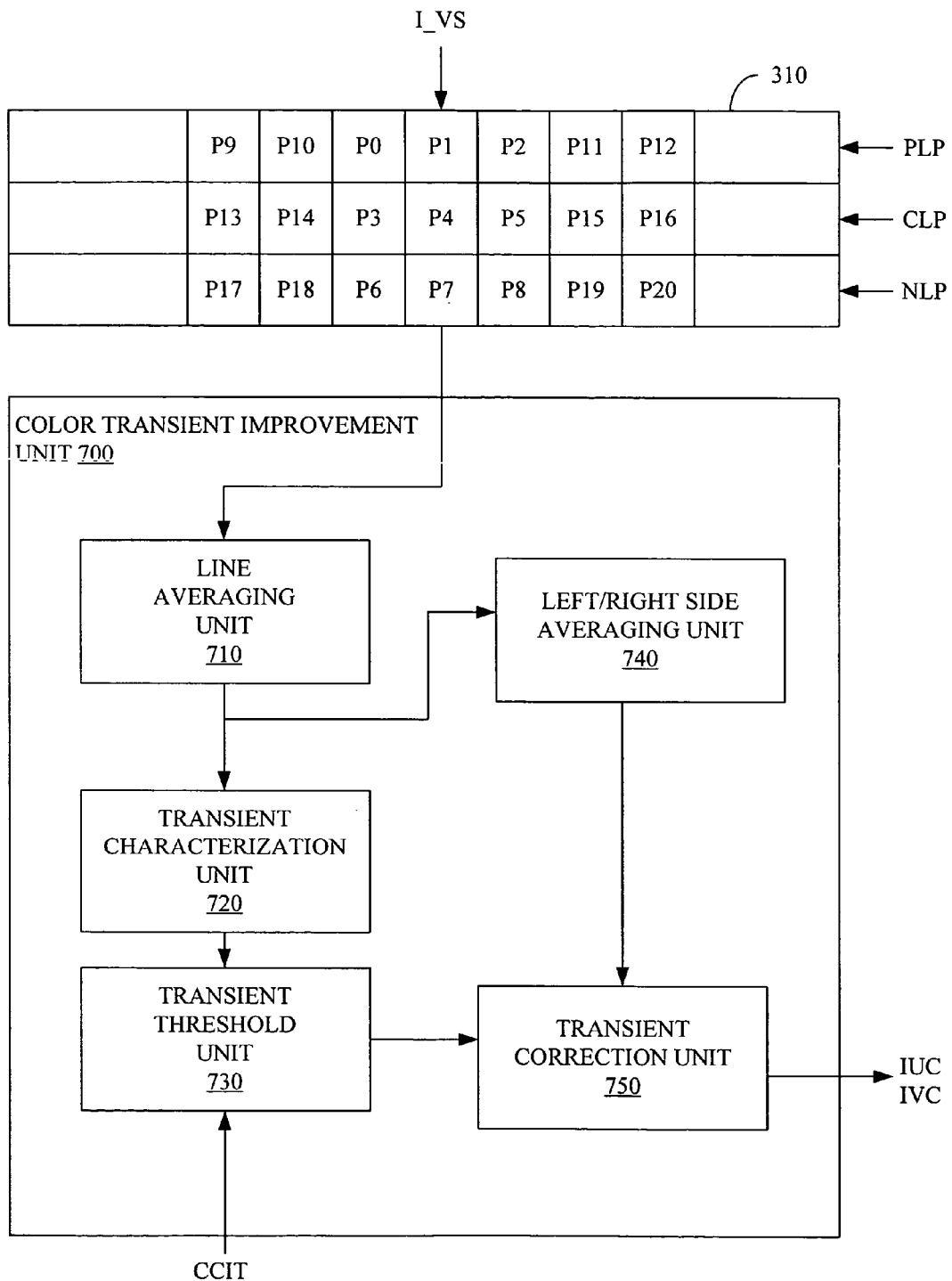
FIG. 7 is a simplified block diagram for a digital Color Transient Improvement unit in accordance with one embodiment of the present invention.

Color transient improvement unit 326 (FIG. 3) detects color transients such as illustrated in FIGS. 6(d) and 6(e) that indicate the transition from a first color region to a second color region. The color transients are then sharpened to be more like the ideal color transients illustrated in FIGS. 6(b) and 6(c). In general horizontal color transient along vertical edges are more severe than vertical color transients. Thus, the embodiment of the present invention described below with respect to FIG. 7 is designed to improve horizontal color transients. However, one skilled in the art can easily adapt the techniques of the present invention for vertical color transients.

FIG. 7 illustrates a color transient improvement unit 700, which detects color transients utilizing a 3×7 color transient detection window. Other embodiments of the present invention may use a different sized color transient detection window. Generally, a wider color transient detection window (i.e. larger in the horizontal direction) will provide better detection for wider color transient areas. However, a wider color transient detection window may produce erroneous results when multiple color transients are present within the color transient detection window. Conversely, a thinner color transient detection window may cause mischaracterization of wider color transient areas. For clarity, the examples presented herein use a color transient detection window of width 7, which is the default value of one embodiment of the present invention. One skilled in the art can easily adapt the teachings presented herein to color transient detection windows of other sizes. In general using color transient detection windows having widths between 5 and 15, inclusive, provide good results. For horizontal transients, using line averaging (as described below) on taller color transient detection windows (i.e. having more lines vertically) provides smoother results by avoiding jagged edges between color regions. However, if the color transient detection window is too tall, some color transients might go undetected. Moreover, line averaging over too many lines might distort diagonal transients. Furthermore, to support tall windows more resources (i.e. line buffers) are required. In one embodiment of the present invention, the height of the color transient detection window can range from 1 to 5 with a default value of 3.

Color transient improvement unit 700 is coupled to buffer 310, which is illustrated using previous line pointer PLP, current line pointer CLP and next line pointer NLP. Color transient improvement unit 700 generates improved U chrominance value IUC and improved V chrominance value IVC for a current pixel P4 using the chrominance values of pixels P0-P20. For consistency, pixels P0-P8 are in the same locations as in FIG. 4. Specifically, current pixel P4, pixel P3 and pixel P5 are in the current line (i.e. in the line buffer pointed to by current line buffer CLP), with pixel P3 to the left of current pixel P4 and pixel P5 to the right of current pixel P4. Pixels P0, P1, and P2 are in the previous line (i.e. in the line buffer pointed to by previous line buffer PLP) directly above pixels P3, P4, and P5, respectively. Conversely, pixels P6, P7, and P8 are in the next line (i.e. in the line buffer pointed to by the next line buffer NLP), directly below pixels P3, P4, and P5, respectively. Furthermore, pixels P9 and P10 are in the previous line with pixel P10 to the left of and adjacent to pixel P0 and pixel P9 left of and adjacent to pixel P10. Pixels P11 and P12 are in the previous line with pixel P11 to the right and adjacent to pixel P2 and pixel P12 to the right of and adjacent to pixel P11. Pixels P13 to P16 are in the current line directly below pixels P9 to P12, respectively. Pixels P17 to P20 are in the next line directly below pixels P13 to P16, respectively. For clarity the U chrominance value and V chrominance value of a pixel PX are referenced as U chrominance value UCX and V chrominance value VCX, respectively. Thus, the U chrominance value and V chrominance value of pixel P5 is U chrominance value UC5 and V chrominance value VC5.

Line averaging unit 710 calculates average chrominance values for each pixel position within the color transient detection window by averaging the chrominance values of the pixels on each line at the same pixel position. Specifically, line averaging unit 710 calculates seven average U chrominance values AUC1 to AUC7 and seven average V chrominance values AVC1 to AVC7. Average U chrominance value AUC1 is equal to the average of U chrominance values UC9, UC13, and UC17, i.e. the U chrominance values of pixels P9, which is in the first pixel position in the color transient detection window on the previous line; P13, which is in the first pixel position in the color transient detection window on the next line; and pixel P17, which is in the first pixel position in the color transient detection window on the next line. Average U chrominance value AUC2 is equal to the average of U chrominance values UC10, UC14, and UC18. Average U chrominance value AUC3 is equal to the average of U chrominance values UC0, UC3, and UC6. Average U chrominance value AUC4 is equal to the average of U chrominance values UC1, UC4, and UC7. Average U chrominance value AUC5 is equal to the chrominance value AUC6 is equal to the average of U chrominance values UC11, UC15, and UC19. Average U chrominance value AUC7 is equal to the average of U chrominance values UC12, UC16, and UC20.

Similarly, Average U chrominance value AVC1 is equal to the average of V chrominance values VC9, VC13, and VC17. Average V chrominance value AVC2 is equal to the average of V chrominance values VC10, VC14, and VC18. Average V chrominance value AVC3 is equal to the average of V chrominance values VC0, VC3, and VC6. Average V chrominance value AVC4 is equal to the average of V chrominance values VC1, VC4, and VC7. Average V chrominance value AVC5 is equal to the average of V chrominance values VC2, VC5, and VC8. Average V chrominance value AVC6 is equal to the average of V chrominance values VC11, VC15, and VC19. Average V chrominance value AVC7 is equal to the average of V chrominance values VC12, VC16, and VC20.

Transient characterization unit 720 uses the average U chrominance values and average V chrominance values to assign transient characterization values that correspond to the likelihood of a color transition occurring in the color transient detection window. Specifically, in one embodiment of the present invention, transient characterization unit 720 generates an average U chrominance increment sum AUCIS, an average U chrominance decrement sum AUCDS, an average V chrominance increment sum AVCIS, and an average V chrominance decrement sum AVCDS. For every color transient detection window, average U chrominance increment sum AUCIS, an average U chrominance decrement sum AUCDS, an average V chrominance increment sum AVCIS, and an average V chrominance decrement sum AVCDS are all first set initially to zero. Average U chrominance increment sum AUCIS is incremented by one for each average U chrominance value AUCX that is greater than or equal to average U chrominance values AUC(X−1), where X is in the ranges from 2 to 7. Thus, average U chrominance increment sum AUCIS provides a measure that corresponds to the degree that the average U chrominance values calculated by line averaging unit 710 is monotonically increasing (from left to right). Average U chrominance decrement sum AUCDS is incremented by one for each average U chrominance value AUCX that is less than or equal to average U chrominance value AUC(X−1), where X is in the ranges from 2 to 7. Thus, average U chrominance decrement sum AUCDS provides a measure that corresponds to the degree that the average U chrominance values calculated by line averaging unit 710 are monotonically decreasing (from left to right).

Similarly, Average V chrominance increment sum AVCIS is incremented by one for each average V chrominance value AVCX that is greater than or equal to average V chrominance value AVC(X−1), where X is in the ranges from 2 to 7. Thus, average V chrominance increment sum AVCIS provides a measure that corresponds to the degree that the average V chrominance values calculated by line averaging unit 710 are monotonically increasing. Average V chrominance decrement sum AVCDS is incremented by one for each average V chrominance value AVCX that is less than or equal to average V chrominance value AVC(X−1), where X is in the ranges from 2 to 7. Thus, average V chrominance decrement sum AVCDS provides a measure that corresponds to the degree that the average V chrominance values calculated by line averaging unit 710 are monotonically decreasing.

As illustrated in FIGS. 6(*d*) and 6(*e*) when both the U chrominance values of a line of pixels and the V chrominance values of a line of pixels are monotonically increasing or monotonically decreasing, the likelihood that the pixels are near a transition between color regions is high. However, due to line averaging and the possible existence of chrominance noise, color transitions may occur even if the average U chrominance values or average V chrominance values calculated by line averaging unit 710 are not strictly monotonically increasing or decreasing. Thus, transient threshold unit 730 uses a programmable chrominance color improvement threshold CCIT to determine whether the chrominance values of current pixel P4 should be modified. Specifically, transient threshold unit 730 compares average U chrominance increment sum AUCIS, average U chrominance decrement sum AUCDS, average V chrominance increment sum AVCIS, and average V chrominance decrement sum AVCDS with chrominance color improvement threshold CCIT. If average U chrominance increment sum AUCIS is greater than or equal to chrominance color improvement threshold CCIT or average U chrominance decrement sum AUCDS is greater than or equal to chrominance color improvement threshold CCIT and average V chrominance increment sum AVCIS is greater than or equal to chrominance color improvement threshold CCIT or average V chrominance decrement sum AVCDS is greater than or equal to chrominance color improvement threshold CCIT then the chrominance values of the current pixel should be modified. In symbolic form transient threshold unit 730 performs the following: If ((AUCIS>=CCIT) OR (AUCDS>=CCIT)) AND ((AVCIS>=CCIT) OR (AVCDS>=CCIT)) then modify current pixel chrominance values.

Transient correction unit 750 generates improved U chrominance value IUC and improved V chrominance value IVC based on information provided by left/right side averaging unit 740 and transient threshold unit 730. As explained above, transient threshold unit 730 determines whether the chrominance values of current pixel P4 should be modified. When the chrominance values of the current pixel should not be modified as determined by transient threshold unit 730, transient correction unit 750 sets improved U chrominance value IUC to be equal to the U chrominance value UC4, which is the U chrominance value of current pixel P4. Similarly, when the chrominance values of the current pixel should not be modified as determined by transient threshold unit 730, transient correction unit 750 sets improved V chrominance value IVC to be equal to the V chrominance value VC4, which is the V chrominance value of current pixel P4.

When transient threshold unit 730 determines that the chrominance values of the current pixel should be modified transient correction unit 750 determines whether the current pixel is closer to the pixels to the left of the current pixel in the color transient detection window or closer to the pixels to the right of the current pixel in the color transient detection window. In the embodiment of the invention described below rather than using the chrominance value of the current pixel, average U chrominance value AUC4 and average V chrominance value AVC4 as a proxy for the chrominance values of the current pixel to determine whether to use the pixels to the left or to the right of the current pixel. However other embodiments of the present invention can use other proxy chrominance values or use the actual chrominance values of the current pixel (i.e. U chrominance value UC4 and V chrominance value VC4).

Left/right side averaging unit 740 calculates the average U chrominance and average V chrominance of the pixels to the left of the current pixel and of the pixels to the right of the current pixel. Specifically for the embodiment of FIG. 7, an average left side U chrominance value ALSUC is equal to the average of U chrominance values UC9, UC10, UC0, UC13, UC14, UC3, UC17, UC18, and UC6. An average left side V chrominance value ALSVC is equal to the average of V chrominance values VC9, VC10, VC0, VC13, VC14, VC3, VC17, VC18, and VC6. An average right side chrominance values UC2, UC1, UC12, UC5, UC15, UC16, UC8, UC19, and UC20. An average right side V chrominance value ARSVC is equal to the average of V chrominance values VC2, VC11, VC12, VCS, VC15, VC16, VC8, VC19, and VC20.

If the average U chrominance value AUC4 is closer to average left side U chrominance value ALSUC than to average right side U chrominance value ARSUC and if the average V chrominance value AVC4 is closer to average left side V chrominance value ALSVC than to average right side V chrominance value ARSVC then transient correction unit 750 sets improved U chrominance value IUC and improved V chrominance value IVC equal to average left side U chrominance value ALSUC and average left side V chrominance value ALSVC, respectively. Conversely, if the average U chrominance value AUC4 is closer to average right side U chrominance value ARSUC than to average left side U chrominance value ALSUC and if the average V chrominance value AVC4 is closer to average right side V chrominance value ARSVC than to average left side V chrominance value ALSVC then transient correction unit 750 sets improved U chrominance value IUC and improved V chrominance value IVC equal to average right side U chrominance value ARSUC and average right side V chrominance value ARSVC, respectively. Appendix I presents a pseudo-code implementation of one embodiment of transient threshold unit 730 and transient correction unit 750. One skilled in the art can easily convert the pseudo-code of Appendix I into VHDL or Verilog to create a hardware implementation.

Returning to FIG. 3, improved U chrominance value IUC and improved V chrominance value IVC are further enhanced by color saturation control unit 328. Specifically, color saturation control unit 328 enhances the saturation of improved U chrominance value IUC and improved V chrominance value IVC to generate saturation enhanced U chrominance value SEUC and saturation enhanced V chrominance value SEVC. Color saturation control unit 328 enhances the color of the input video signal by increasing the saturation by a base saturation enhancement factor BSEF. The ratio of improved U chrominance value IUC to improved V chrominance value IVC (i.e. IUC/IVC) defines the color for the current pixel. The norm of (IUC, IVC) defines the saturation. When improved V chrominance value IVC is zero, the color is determined by improved U chrominance value IUC. Specifically, the sign (positive or negative) of improved U chrominance value IUC defines the color and the absolute value of improved U chrominance value IUC defines the saturation. When both improved U chrominance value IUC and improved V chrominance value IVC are zero, no color is defined, and the pixel is a grey scale pixel defined by the luminance information.

Increased saturation can be achieved by increasing the norm of (IUC, IVC), which is equal to the square root of the sum of the squares of improved U chrominance value IUC and improved V chrominance value IVC (i.e. sqrt(IUC$^2$+ IVC$^2$)). However, the ratio of saturation enhanced U chrominance value SEUC to saturation enhanced V chrominance value SEVC (i.e. SEUC/SEVC), should be equal to the ratio of improved U chrominance value IUC to improved V chrominance value IVC (i.e. IUC/IVC) to avoid introducing color distortions. For conciseness and clarity, the term saturated enhanced chrominance ratio SEUC/SEVC is used for the ratio of saturation enhanced U chrominance value SEUC to saturation enhanced V chrominance value SEVC. Similarly, the term improved chrominance ratio IUC/IVC is used to for the ratio of improved U chrominance value to IUC to improved V chrominance value IVC.

Thus, in general, the saturation can be enhanced by multiplying both improved U chrominance value IUC and improved V However, the various U chrominance values and V chrominance values IVC are typically bounded in a chrominance range C_RANGE between a minimum chrominance value C_MIN and a maximum chrominance value C_MAX, inclusive. For example, if 8 bits were used for chrominance values, minimum chrominance value C_MIN would equal −128 and maximum chrominance value C_MAX would equal to 127. If a chrominance value is computed to be outside of chrominance range C_RANGE, the chrominance value would be truncated to equal minimum chrominance value C_MIN (for negative chrominance values) or to equal maximum chrominance value C_MAX (for positive chrominance values). If enhancement by base saturation enhancement factor BSEF would cause either chrominance value to go beyond the chrominance range C_RANGE, color distortion would occur. For example, if base saturation enhancement factor BSEF is equal to 1.2, improved U chrominance value IUC is equal to 120 and improved V chrominance value IVC is equal to 40. Simply multiplying the chrominance values by base saturation enhancement factor BSEF would result in saturation enhanced U chrominance value SEUC being equal to 127 (i.e., 144 truncated to 127) and saturation enhanced V chrominance value SEVC being equal to 48. Thus, saturation enhanced chrominance ratio SEUC/SEVC is equal to 127/48 which is not equal to improved chrominance ratio IUC/IVC, which is equal to 120/40. To avoid color distortion, the present invention uses a scaled saturation enhancement factor SSEF when using a base saturation enhancement factor BSEF that would cause color distortions due to range limitations on the chrominance values.

Figure 8:
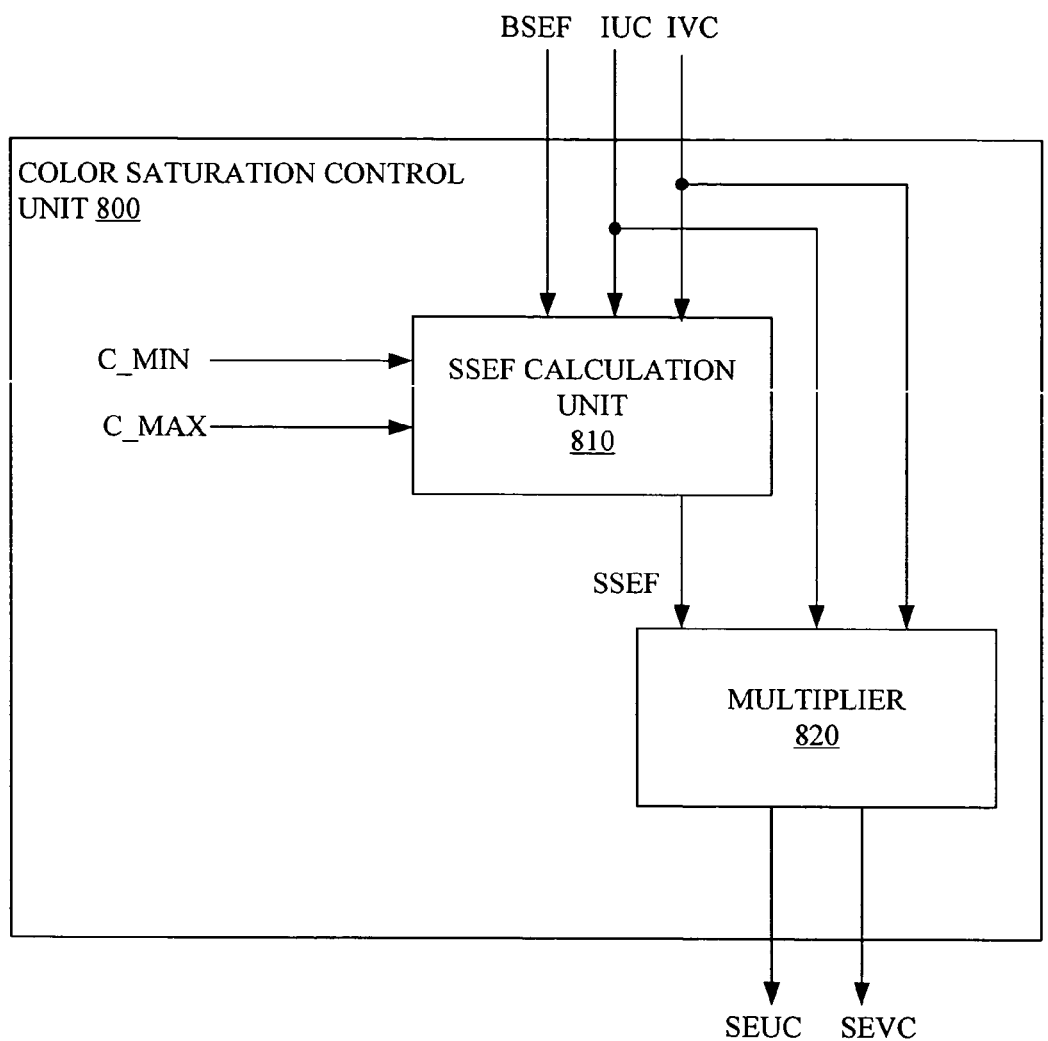
FIG. 8 is a simplified block diagram for a color saturation control unit in accordance with one embodiment of the present invention.

FIG. 8 shows one embodiment of a color saturation control unit 800. The embodiment of FIG. 8 includes a scaled saturation enhancement factor (SSEF) calculation unit 810 and a multiplier 820. SSEF calculation unit 810 computes scaled enhancement factor BSEF, improved U chrominance factor IUC, improved V chrominance factor IVC, maximum chrominance value C_MAX, and minimum chrominance value C_MIN. Specifically, scaled saturation enhancement factor should be equal to base saturation enhancement factor BSEF or the largest possible value without causing the chrominance values to exceed the range of minimum chrominance value C_MIN and maximum chrominance value C_MAX. In one embodiment of the present invention, SSEF calculation unit 810 calculates a maximum U enhancement factor MUEF, and a maximum V enhancement factor MVEF. Scaled saturation enhancement factor SSEF is set equal to the smallest value selected from base saturation enhancement factor BSEF, maximum U enhancement factor MUEF, and maximum V enhancement factor MVEF. Maximum U enhancement factor MUEF can be calculated by selecting the greater of dividing maximum chrominance value C_MAX by improved U chrominance value IUC or dividing minimum chrominance value C_MIN by improved U Chrominance value IUC. Similarly, maximum V enhancement factor MVEF can be calculated by selecting the greater of dividing maximum chrominance value C_MAX by improved V chrominance value IVC or dividing minimum chrominance value C_MIN by improved V Chrominance value IVC. Equations EQ(9), EQ(10), and EQ(11) provides the formula for calculating maximum U enhancement factor MUEF, maximum U enhancement factor MVEF, and scaled saturation enhancement factor SSEF in symbolic form.

$$MUEF = \mathrm{MAX}((C\_MAX/IUC), (C\_MIN/IUC)) \qquad \mathrm{EQ}(9)$$

$$MVEF = \mathrm{MAX}((C\_MAX/IVC), (C\_MIN/IVC)) \qquad \mathrm{EQ}(10)$$

$$SSEF = \mathrm{MIN}(BSEF, MUEF, MVEF) \qquad \mathrm{EQ}(11)$$

When improved U chrominance value IUC is equal to 0, maximum U enhancement factor MUEF set equal to a pre-defined large number DIV0 rather than performing the division operations (which would result in a divide by zero error). Similarly when improved V chrominance value IVC is zero, maximum V enhancement factor MVEF is set equal to pre-defined large number DIV0 rather than performing the division operations. Pre-defined large number DIV0 should be large enough so that scaled saturation enhancement factor SSEF would not be equal to pre-defined large number DIV0, i.e. pre-defined large number DIV0 should be greater than the largest values expected for base saturation enhancement factor BSEF.

After SSEF calculation unit 810 calculates scaled saturation enhancement factor SSEF, multiplier 820 calculates saturation enhanced U chrominance value SEUC and saturation enhanced V chrominance value SEVC by multiplying scaled saturation enhancement factor SSEF with improved U chrominance value IUC and improved V chrominance value IVC, respectively.

Figure 9:
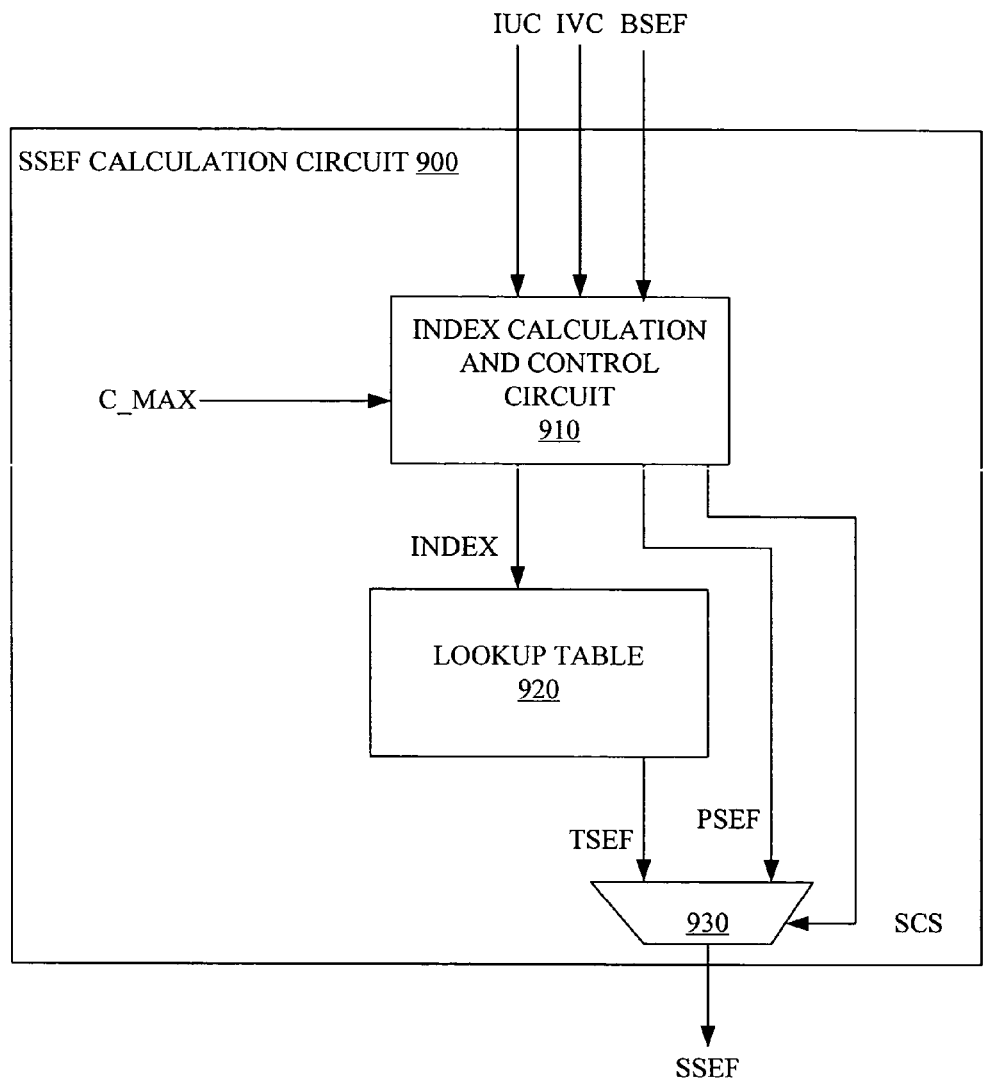
FIG. 9 is a block diagram of a SSEF calculation unit in accordance with one embodiment of the present invention.

In the embodiment of FIG. 8 a floating point division circuit is used in the calculation of scaled saturation enhancement circuit SSEF. However, floating point division circuits require a large amount of silicon resources to implement and require many clock cycles to execute. Therefore, some embodiments of the present invention implement SSEF calculation circuit 810 using a lookup table. FIG. 9 illustrates a SSEF calculation circuit 900 in accordance with one embodiment of the present invention. The embodiment of FIG. 9 includes an index calculation and control circuit 910, a lookup table (LUT) 920, and a multiplexer 930.

Index calculation and control circuit 910 generates an index value INDEX for lookup table 920, a preset saturation enhancement value PSEF, and a selection control signal SCS to control multiplexer 930. Preset saturation enhancement factor PSEF is provided to a first input port of multiplexer 930. Lookup table 920 provides a tabled saturation enhancement factor TSEF, which is provided on a second input port of multiplexer 930. Multiplexer 930 drives either tabled saturation enhancement factor TSEF or preset saturation enhancement factor PSEF as scaled saturation enhancement factor SSEF under control of index calculation and control circuit 910.

Index calculation and control circuit 910 drives either base saturation enhancement factor BSEF or one (i.e. 1) as preset saturation enhancement factor PSEF. Specifically, if improved U chrominance value IUC or improved V chrominance value IVC is equal to minimum chrominance value C_MIN or maximum chrominance value C_MAX, then the saturation of the current pixel cannot be further enhanced. Therefore, scaled saturation enhancement factor should equal one. Accordingly, index calculation and control circuit 910 sets preset saturation enhancement factor PSEF equal to one and drives saturation control signal SCS so that multiplexer 930 uses preset saturation enhancement factor PSEF as scaled saturation enhancement factor SSEF. Otherwise, index calculation and control circuit 910 sets preset saturation enhancement factor PSEF equal to base saturation enhancement factor BSEF.

Index calculation and control circuit 910 calculates index INDEX as the greater of the absolute value of improved U chrominance value IUC and the absolute value of improved V chrominance value IVC (i.e. INDEX=MAX(abs(IUC), abs(IVC)). However, if index INDEX is greater than maximum chrominance value C_MAX (i.e. 127 in the case of 8-bit chrominance values), which would occur if improved U chrominance value IUC or improved V chrominance value IVC is equal to minimum chrominance value C_MIN (i.e. −128 in the case of 8-bit chrominance values), then index INDEX can be set equal to any valid range of lookup table 920 because multiplexer 930 is configured (as described above) to use preset saturation enhancement factor PSEF. When index INDEX is less than one plus the integer value of maximum chrominance value C_MAX divided by base saturation enhancement factor BSEF (i.e. 1+INT(C_MAX/BSEF)), index calculation and control circuit 910 drives saturation control signal SCS so that multiplexer 930 uses preset saturation enhancement factor PSEF as scaled saturation enhancement factor SSEF. To avoid performing floating point division, the comparison can be rearranged as when index INDEX multiplied with BSEF is less than or equal to the maximum chrominance value C_MAX (i.e. INDEX*BSEF<=C_MAX) then index calculation and control circuit 910 drives saturation control signal SCS so that multiplexer 930 uses preset saturation enhancement factor PSEF as scaled saturation enhancement factor SSEF. As explained above in these situations preset saturation enhancement factor PSEF is equal to base saturation enhancement factor BSEF. When index INDEX multiplied with BSEF is greater than the maximum chrominance value C_MAX and INDEX is less than the maximum chrominance value C_MAX, index calculation and control circuit 910 drives saturation control signal SCS so that multiplexer 930 uses tabled saturation enhancement factor TSEF as scaled saturation enhancement factor SSEF. Because preset saturation enhancement factor PSEF is equal to base saturation enhancement factor BSEF or 1, some embodiments of the present invention may use a three input multiplexing circuit having a first input port coupled to receive the base saturation enhancement factor, a second input port coupled to receive the tabled saturation enhancement factor, a third input port coupled to receive a value of one. Appendix II provides a pseudo-code implementation of SSEF calculation circuit 900 that uses a lookup table 920 configured as described below. One skilled in the art can easily translate the pseudo-code of Appendix II into VHDL or Verilog to generate a hardware implementation.

Lookup table 920 includes a plurality of tabled saturation enhancement factors TSEFs that are selected by an index INDEX. The tabled saturation enhancement factors TSEFs of lookup table 920 depends on the precision, i.e. number of bits, of multiplier 820 (FIG. 8). For example if improved U chrominance value is 123, improved V chrominance value is 40, maximum chrominance value is 127, an unlimited precision multiplier would allow scaled saturation enhancement factor SSEF to be equal to 1.0325203252 . . . (i.e. 127/123). However if multiplier 820 is a 5-bit multiplier, a scaled saturation enhancement factor SSEF equal to 1.0325203252, if rounded to 1.0625, would cause saturation enhanced U chrominance value SEUC to be equal to 130.7 (1.0625*123), which would be truncated to 130, which is out of the chrominance range C_RANGE. For a 5-bit multiplier, scaled saturation enhancement factor SSEF should be equal to 1.03125, which leads to scaled saturation enhancement factor SEUC being equal to 126.8, and 126 after truncation which is within C_RANGE. Equation EQ(12) provides a formula for the generation of tabled saturation enhancement factors TSEFs for lookup table 920 having index values INDEX and maximum chrominance value C_MAX using a multiplier having PB bits of precision in accordance with one embodiment of the present invention.

$$TSEF=INT((C\_MAX/INDEX)*(2^{PB}))/(2^{PB}) \qquad EQ(12)$$

To minimize the size of lookup table 920, some embodiments of the present invention limits the size of base saturation enhancement factor BSEF to a maximum saturation enhancement factor MSEF. As explained above, When index INDEX multiplied with BSEF is greater than the maximum chrominance value C_MAX and INDEX is less than the maximum chrominance value C_MAX, index calculation and control circuit 910 drives saturation control signal SCS so that multiplexer 930 uses tabled saturation enhancement factor TSEF as scaled saturation enhancement factor SSEF. Thus, if base saturation enhancement factor BSEF is limited to maximum saturation enhancement factor MSEF, lookup table 920 only needs to contain tabled saturation enhancement factors TSEFs for index values from one plus the integer value of maximum chrominance value C_MAX divided by maximum saturation enhancement factor MSEF (i.e. 1+INT (C_MAX/MSEF)) to maximum chrominance value C_MAX. For example, if C_MAX is equal to 127, maximum saturation enhancement factor MSEF is equal to 2, lookup table 920 only needs to contain values for indices from 64 to 127 and therefore only has to contain 64 tabled saturation enhancement factors TSEFs.

In the various embodiments of the present invention, novel structures have been described for enhancing images of a video stream. Specifically, contour enhancement and luminance contrast stretching are used to improve the luminance values of the images. In addition color transient improvement and color saturation control are performed to enhance the chrominance values of the images. The various embodiments of the structures and methods of this invention that are described above are illustrative only of the principles of this invention and are not intended to limit the scope of the invention to the particular embodiments described. For example, in view of this disclosure those skilled in the art can define other contour enhancement units, luminance contrast stretching units, color transient improvement units, color saturation control units, contour proxies, contour directions, slopes, slope directions, contour detection unit, contour enhanced luminance calculation unit, contour threshold comparison unit, color transient detection chrominance proxies, V chrominance proxies, transient characterization unit, transient threshold units, transient correction units, saturation enhancement factors, saturation enhanced chrominance values, maximum saturation enhancement factors, table indices, lookup tables, table entries, scaled saturation enhancement factor calculation units, multipliers, index calculation units, multiplexing circuits, index calculation and control circuit and so forth, and use these alternative features to create a method, circuit, or system according to the principles of this invention. Thus, the invention is limited only by the following claims.

APPENDIX I

```
AUCIS   = average U chrominance increment sum
AUCDS   = average U chrominance decrement sum
AVCIS   = average V chrominance increment sum
AVCDS   = average V chrominance decrement sum
AUC4    = average U chrominance value of the current pixel column
            in the transient detection window
AVC4    = average V chrominance value of the current pixel column
            in the transient detection window
UC4     = U chrominance value of the current pixel
VC4     = V chrominance value of the current pixel
ARSUC   = average right side U chrominance
ALSUC   = average left side U chrominance
ARSVC   = average right side V chrominance
ALSVC   = average left side V chrominance
CCIT    = chrominance color improvement threshold
IUC     = improved U chrominance
IVC     = improved V chrominance
IF   ((AUCIS >= CCIT) OR (AUCDS >= CCIT)) AND
     ((AVCIS >= CCIT) OR (AVCDS >= CCIT)]) THEN
     {
     IF ABS(AUC4-ALSUC) < ABS(AUC4-ARSUC) AND
         ABS(AVC4-ALSVC) < ABS(AVC4-ARSVC) THEN
         {
         IUC = ALSUC
         IVC = ALSVC
         }
     ELSE IF ABS(AUC4-ALSUC) > ABS(AUC4-ARSUC) AND
            ABS(AVC4-ALSVC) > ABS(AVC4-ARSVC) THEN
         {
         IUC = ARSUC
         IVC = ARSVC
         }
     ELSE
         {
         IUC=UC4
         IVC=VC4
         }
ELSE
     {
     IUC=UC4
     IVC=VC4
     }
```

APPENDIX II

```
IUC     = improved U chrominance
IVC     = improved V chrominance
C_MAX   = maximum chrominance value
C_MIN   = minimum chrominance value
BSEF    = base saturation enhancement factor
INDEX   = index to a lookup table
TSEF    = tabled saturation enhancement factor
            (from a lookup table indexed by INDEX)
INDEX = max(abs(IUC), abs(IVC))
IF (INDEX >= C_MAX) then
     {
     INDEX=C_MAX
     SSEF = 1
     }
ELSE IF (INDEX*BSEF ≤ C_MAX) then
     {
     SSEF=BSEF
     }
ELSE IF (INDEX*BSEF > C_MAX) and (INDEX < C_MAX)) then
     {
     SSEF=TSEF
     }
```

What is claimed is:

1. A method of improving color transients of an image having a plurality of pixels, the method comprising:
    defining a color transient detection window around a current pixel;
    calculating one or more transient characterization values for the color transient detection window with a transient characterization unit, wherein the transient characterization values correspond to a likelihood of a color transition occurring in the color transient detection window; and
    generating an improved U chrominance value and an improved V chrominance value for the current pixel;
    wherein the calculating one or more transient characterization values for the color transient detection window further comprises:
        calculating an average U chrominance value for each column of the color transient detection window to form a plurality of average U chrominance values;
        calculating an average V chrominance value for each column of the color transient detection window to form a plurality of average V chrominance values;
        calculating a first U transient characterization value corresponding to a degree that the plurality of average U chrominance values is monotonically increasing; and
        calculating a first V transient characterization value corresponding to a degree that the plurality of average V chrominance values is monotonically increasing.

2. The method of claim 1, wherein the color transient detection window includes 3 lines of 7 pixels centered around the current pixel.

3. The method of claim 1, wherein calculating one or more transient characterization values for the color transient detection window further comprises:
    calculating a second U transient characterization value corresponding to a degree that the plurality of average U chrominance values is monotonically decreasing; and
    calculating a second V transient characterization value corresponding to a degree that the plurality of average V chrominance values is monotonically decreasing.

4. The method of claim 3, wherein the first U transient characterization value is an average U chrominance increment sum, the second U transient characterization value is an average U chrominance decrement sum, the first V transient characterization value is an average V chrominance increment sum, and the second V transient characterization value is an average V chrominance decrement sum.

5. The method of claim 3, wherein calculating one or more transient characterization values for the color transient detection window further comprises determining that a color transient exits in the color transient detection window when the first U transient characterization value and the first V transient characterization value are greater than a chrominance color improvement threshold.

6. The method of claim 5, wherein calculating one or more transient characterization values for the color transient detection window further comprises determining that a color transient exits in the color transient detection window when the first U transient characterization value and the second V transient characterization value are greater than the chrominance color improvement threshold.

7. The method of claim 6, wherein calculating one or more transient characterization values for the color transient detection window further comprises determining that a color transient exits in the color transient detection window when the second U transient characterization value and the first V transient characterization value are greater than the chrominance color improvement threshold.

8. The method of claim 7, wherein calculating one or more transient characterization values for the color transient detection window further comprises determining that a color transient exits in the color transient detection window when the second U transient characterization value and the second V transient characterization value are greater than the chrominance color improvement threshold.

9. The method of claim 8, wherein generating an improved U chrominance value and an improved V chrominance value for the current pixel comprises:
   defining a U chrominance proxy for the U chrominance value of the current pixel;
   defining a V chrominance proxy for the V chrominance value of the current pixel;
   calculating an average left side U chrominance value;
   calculating an average right side U chrominance value;
   calculating an average left side V chrominance value;
   calculating an average right side V chrominance value;
   setting the improved U chrominance value and the improved V chrominance value equal to the average left side U chrominance value and the average left side V chrominance value, respectively, when a color transient exists in the color transient detection window, the U chrominance proxy is closer to the average left side U chrominance value than to the average right side U chrominance value, and the V chrominance proxy is closer to the average left side V chrominance value than to the average right side V chrominance value; and
   setting the improved U chrominance value and the improved V chrominance value equal to the average right side U chrominance value and the average right side V chrominance value, respectively, when a color transient exists in the color transient detection window, the U chrominance proxy is closer to the average right side U chrominance value than to the average left side U chrominance value, and the V chrominance proxy is closer to the average right side V chrominance value than to the average left side V chrominance value.

10. The method of claim 9, wherein the U chrominance proxy is equal to the average U chrominance value containing the current pixel and the V chrominance proxy is equal to the average V chrominance value containing the current pixel.

11. The method of claim 9, wherein the U chrominance proxy is equal to the U chrominance value of the current pixel and the V chrominance proxy is equal to the V chrominance value of the current pixel.

12. The method of claim 9, wherein
the average left side U chrominance value is equal to an average of U chrominance values from pixels in the color transient detection window to the left of the current pixel; and
the average right side U chrominance value is equal to an average of U chrominance values from pixels in the color transient detection window to the right of the current pixel.

13. The method of claim 9, wherein
the average left side V chrominance value is equal to an average of V chrominance values from pixels in the color transient detection window to the left of the current pixel; and
the average right side V chrominance value is equal to an average of V chrominance values from pixels in the color transient detection window to the right of the current pixel.

14. The method of claim 1, wherein generating an improved U chrominance value and an improved V chrominance value for the current pixel comprises:
   defining a U chrominance proxy for the U chrominance value of the current pixel;
   defining a V chrominance proxy for the V chrominance value of the current pixel;
   calculating an average left side U chrominance value;
   calculating an average right side U chrominance value;
   calculating an average left side V chrominance value;
   calculating an average right side V chrominance value;
   setting the improved U chrominance value and the improved V chrominance value equal to the left side average U chrominance value and the left side average V chrominance value, respectively, when a color transient exists in the color transient detection window, the U chrominance proxy is closer td the left side average U chrominance value than to the right side average U chrominance value, and the V chrominance proxy is closer to the left side average V chrominance value than to the right side average V chrominance value; and
   setting the improved U chrominance value and the improved V chrominance value equal to the right side average U chrominance value and the right side average V chrominance value, respectively, when a color transient exists in the color transient detection window, the U chrominance proxy is closer to the right side average U chrominance value than to the left side average U chrominance value, and the V chrominance proxy is closer to the right side average V chrominance value than to the left side average V chrominance value.

15. The method of claim 14, wherein
the left side average U chrominance value is equal to an average of U chrominance values from pixels in the color transient detection window to the left of the current pixel; and
the right side average U chrominance value is equal to an average of U chrominance values from pixels in the color transient detection window to the right of the current pixel.

16. The method of claim 14, wherein
the left side average V chrominance value is equal to an average of V chrominance values from pixels in the color transient detection window to the left of the current pixel; and the right side average V chrominance value is equal to an average of V chrominance values from pixels in the color transient detection window to the right of the current pixel.

17. A color transient improvement unit for improving color transients of an image having a plurality of pixels comprising:
   a transient characterization unit configured to calculate one or more transient characterization values for a color transient detection window containing a current pixel;
   a transient threshold unit coupled to the transient characterization unit and configured to determine whether a color transient exists in the color transient detection window by comparing the transient characterization values to a chrominance color improvement threshold;
   a transient correction unit coupled to the transient threshold unit and configured to generate an improved U chrominance value and an improved V chrominance value for the current pixel; and
   a line averaging unit coupled to the transient characterization unit and configured to calculate an average U chrominance value and an average V chrominance value for each column of the color transient detection window to form a plurality of average U chrominance values and a plurality of V chrominance values.
   wherein the transient characterization unit is configured to calculate a first U transient characterization value corresponding to a degree that the plurality of average U chrominance values is monotonically increasing and to calculate a first V transient characterization value corresponding to a degree that the plurality of average V chrominance values is monotonically increasing.

18. The color transient improvement unit of claim 17, wherein the transient characterization unit is configured to calculate a second U transient characterization value corresponding to a degree that the plurality of average U chrominance values is monotonically decreasing and to calculate a second V transient characterization value corresponding to a degree that the plurality of average V chrominance values is monotonically decreasing.

19. The color transient improvement unit of claim 17 further comprising an averaging unit configured to calculating a left side average U chrominance value, a right side average U chrominance value, a left side average V chrominance value, and a right side average V chrominance value.

20. The color transient improvement unit of claim 19, wherein the transient correction unit is configured to set the improved U chrominance value and the improved V chrominance value equal to the left side average U chrominance value and the left side average V chrominance value, respectively, when a color transient exists in the color transient detection window, a U chrominance proxy is closer to the left side average U chrominance value than to the right side average U chrominance value, and a V chrominance proxy is closer to the left side average V chrominance value than to the right side average V chrominance value.

21. The color transient improvement unit of claim 20, wherein the transient correction unit configured to set the improved U chrominance value and the improved V chrominance value equal to the right side average U chrominance value and the right side average V chrominance value, respectively, when a color transient exists in the color transient detection window, the U chrominance proxy is closer to the right side average U chrominance value than to the left side average U chrominance value, and the V chrominance proxy is closer to the right side average V chrominance value than to the left side average V chrominance value.

22. The color transient improvement unit of claim 20, wherein the U chrominance proxy is equal to the average U chrominance value containing the current pixel and the V chrominance proxy is equal to the average V chrominance value containing the current pixel.

23. The color transient improvement unit of claim 20, wherein
   the left side average U chrominance value is equal to an average of U chrominance values from pixels in the color transient detection window to the left of the current pixel; and
   the right side average U chrominance value is equal to an average of U chrominance values from pixels in the color transient detection window to the right of the current pixel.

24. The color transient improvement unit of claim 20, wherein
   the left side average V chrominance value is equal to an average of V chrominance values from pixels in the color transient detection window to the left of the current pixel; and
   the right side average V chrominance value is equal to an average of V chrominance values from pixels in the color transient detection window to the right of the current pixel.

* * * * *

UNITED STATES PATENT AND TRADEMARK OFFICE
CERTIFICATE OF CORRECTION

PATENT NO. : 7,532,255 B2 Page 1 of 1
APPLICATION NO. : 10/839740
DATED : May 12, 2009
INVENTOR(S) : Ge Zhu It is certified that error appears in the above-identified patent and that said Letters Patent is hereby corrected as shown below:

<u>Column 20</u>

Line 39, please delete "td" and substitute --to--.

Signed and Sealed this

Eighth Day of September, 2009

David J. Kappos
*Director of the United States Patent and Trademark Office*